(12) United States Patent
Huang et al.

(10) Patent No.: US 10,894,555 B2
(45) Date of Patent: *Jan. 19, 2021

(54) COLLAPSIBLE STROLLER

(71) Applicant: DYNAMIC MOTION, LLC, Richmond, VA (US)

(72) Inventors: Ying Hui Huang, New South Wales (AU); Anthony Michael Young, New South Wales (AU); Lee Baker, New South Wales (AU); Mark Bayly, New South Wales (AU)

(73) Assignee: DYNAMIC MOTION, LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,725

(22) Filed: Apr. 1, 2019

(65) Prior Publication Data

US 2019/0225251 A1    Jul. 25, 2019

Related U.S. Application Data

(63) Continuation of application No. 15/757,219, filed as application No. PCT/AU2016/050831 on Sep. 2, 2016, now Pat. No. 10,279,831.

(30) Foreign Application Priority Data

Sep. 2, 2015 (AU) .................................. 2015903577

(51) Int. Cl.
*B62B 7/06* (2006.01)
*B62B 9/20* (2006.01)

(52) U.S. Cl.
CPC ................ *B62B 7/062* (2013.01); *B62B 9/20* (2013.01); *B62B 2205/18* (2013.01); *B62B 2205/20* (2013.01)

(58) Field of Classification Search
CPC combination set(s) only.
See application file for complete search history.

(56) References Cited

U.S. PATENT DOCUMENTS 8,985,616 B1    3/2015   Chen
10,279,831 B2 *  5/2019   Huang ................... B62B 7/062
(Continued)

FOREIGN PATENT DOCUMENTS

AU       2014283918 B2    6/2013
CN         204137084 U    2/2015
(Continued)

*Primary Examiner* — Brian L Swenson
(74) *Attorney, Agent, or Firm* — Bernard G. Pike, Pike IP Law, PLLC

(57) ABSTRACT

A collapsible child's stroller with a handle frame (30), a front wheel frame (10) and a rear wheel frame (20), mutually connected at a hinge joint (12, 22, 42) for mutual angular displacement between folded and unfolded configurations. The hinge joint has two spaced apart, parallel hinge axes, about which the frames (10, 20, 30) mutually rotate. The stroller is further provided with a locking element (43, 44) moveable between a locked position in which the frames (10, 20, 30) are locked in the unfolded configuration, and an unlocked position allowing the frames (10, 20, 30) to rotate to the folded configuration. The locking element (43, 44) moves in a direction traverse to the parallel hinge axes to better transfer loads between the frames.

12 Claims, 15 Drawing Sheets

(56) References Cited

U.S. PATENT DOCUMENTS

| | | |
|---|---|---|
| 2002/0041083 A1 | 4/2002 | Britton et al. |
| 2011/0291389 A1 | 12/2011 | Offord |
| 2013/0076009 A1 | 3/2013 | Tsai et al. |
| 2013/0147162 A1 | 6/2013 | Hsu |
| 2013/0270789 A1 | 10/2013 | Fowler et al. |
| 2013/0340205 A1 | 12/2013 | Chuah |

FOREIGN PATENT DOCUMENTS

| | | |
|---|---|---|
| EP | 2502801 A1 | 9/2012 |
| WO | 2015000893 A2 | 1/2015 |

* cited by examiner

COLLAPSIBLE STROLLER

FIELD OF THE INVENTION

The present invention relates to strollers for babies, toddlers and young children. In particular, the invention relates to strollers with collapsible frames that fold into a compact configuration for storage and portability.

BACKGROUND OF THE INVENTION

Strollers are a well known and common way of transporting babies or young children. However, due to their size, strollers typically have collapsible frames that fold into a more compact configuration for storage or to be stowed in a vehicle.

In an effort to achieve a more compact folded configuration, some collapsible strollers have particularly complex hinged and telescopic frame structures. While this may provide a compact folded form, the complexity of the frame increases the production costs. Furthermore, added complexity of the frame tends to weigh against a smooth and reliable folding mechanism. For parents of young children, this operation needs to occur as quickly and simply as possible.

Many countries have official design standards and regulations that apply to strollers. These require the frame to meet certain strength and rigidity thresholds while avoiding hazards such as finger traps and so on. The strength requirement specified by the official standards mean that steel or aluminium alloy are the traditional choices for frame material. However, from the perspective of material costs and high-volume production, polymer frames would be more desirable. Polymers have the added advantage of being lightweight, easily moulded into ergonomic shapes and coloured for greater aesthetic appeal. However, to meet the required strength and structural standards, the polymer would need to be an exotic composite and prohibitively expensive. Alternatively, a cheaper (and weaker) polymer would need to be formed in large cross sections which defeats the purpose of a compact collapsible stroller.

With these issues in mind, there is a need for a collapsible stroller with a predominantly polymer frame that meets the high strength and structural requirements of the official standards, while smoothly, simply and reliably collapsing into a compact folded form.

SUMMARY OF THE INVENTION

Accordingly, the present invention provides a collapsible stroller comprising:
  a handle frame;
  a front wheel frame;
  a rear wheel frame; and
  a hinge joint connecting the handle frame, the front wheel frame and rear wheel frame for mutual angular displacement relative to each other about two spaced parallel hinge axes, the hinge joint having a locking element moveable between an unlocked position allowing the handle, front wheel and rear wheel frames to mutually rotate into a folded configuration, and a locked position in which the handle, front wheel and rear wheel frames are fixed in an unfolded configuration; wherein,
the locking element moves in a direction transverse to the two parallel hinge axes.

Preferably, the handle, front wheel and rear wheel frames are predominantly polymer.

The Applicant has found that configuring the locking element such that its movement is transverse to the hinge axes allows the locking element itself to be a significant structural element of the stroller and in particular the main folding hinge. This allows the stroller to be predominantly polymer with reinforcement at a structurally crucial part.

The locking element can take a variety of forms, but is conveniently provided as a locking pin for ease of production and incorporation into the hinge joint. Traditionally, the main hinge mechanisms in collapsible strollers use a locking pin or equivalent structure which moves parallel to the hinge axis to lock two hinged frame members together. This is adequate for preventing relative rotation of two frame elements but does very little to transfer bending or axial loads between these elements. By configuring the locking pin such that it extends in a direction transverse to the hinge axis, it essentially becomes a significant load bearing element in its own right. In particular, it provides a load bearing element at the connection between two frame elements to transfer substantial loads therebetween. As the locking pin is transverse to the hinge axis, it can also be made physically larger and stronger without any impact on the overall size of the frame elements as it still comfortably fits within the frame element cross-sections.

Preferably, the locking pin is metallic and in a particularly preferred form the locking pin is steel. Preferably the locking pin has a minimum cross sectional dimension of 5 mm. Preferably, the locking pin is solid, as tubular locking pins would risk being crushed. Preferably the locking pin is at least 40 mm long and more preferably at least 55 mm long.

Preferably, the hinge joint has at least two reinforced bearing surfaces adjacent the locking pin when in the locked position, such that structural loads are transferrable between the reinforced bearing surfaces via the locking pin. In some options, the hinge joint has metal axles such that at least one of the reinforced bearing surfaces is provided by one of the metal axles.

In another option, the reinforced bearing surface is provided by a movable element that moves into a load bearing position as the locking pin moves to the locked position and moves away from the load bearing position when the locking pin retracts from the locked position.

Preferably, the hinge joint has a hinge housing of polymer material integrally formed with the polymer rear wheel frame, and the polymer handle frame has an integrally formed spur-gear formation for rotation about one of the hinge axles within the hinge joint, while the front wheel frame has an integrally formed polymer spur-gear formation rotatably mounted at the other of the hinge axles for meshing inter-engagement with the spur-gear formation of the handle frame. Preferably, the locking pin slides within a groove partially defined by the handle frame and partially defined by the front wheel frame. Preferably, the groove is partially defined within the spur-gear formation of the handle frame and partially defined within the spur-gear formation of the front wheel frame such that the section of the groove in the front wheel frame aligns with the section of the groove in the handle frame when in the locked position. Preferably the locking pin is biased into the locked position, by a spring within the section of groove defined by the handle frame.

Preferably the hinge joint has a pin guide surface for sliding engagement with a distal end of the locking pin as the stroller folds and unfolds such that the pin guide surface limits movement of the locking pin when moving from the folded to the unfolded configuration. In a particularly preferred form, the front-wheel frame has a slide surface for receiving the end of the locking pin from the pin guide surface, and smoothly directing the locking pin to the section of the groove in the front-wheel frame that partially defines the locked position. Preferably, the pin guide surface and the slide surface have a common tangent at the point of transition where the pin guide surface hands-off the end of the locking pin to the slide surface. In a particularly preferred form, the locking pin is chamfered or rounded.

Preferably, the handle frame has a grip section and an unlocking actuator connected to the biased locking pin for retracting the locking pin into the unlocked position. Preferably, the direction of movement of the locking pin and the longitudinal extent of the handle frame are angled relative to each other by less than 45 degrees such that actuation of the unlocking actuator is a manual displacement in a direction broadly similar to the direction of movement of the locking pin.

In a particularly preferred form, the longitudinal extent of the handle frame, the rear-wheel frame and the front-wheel frame are substantially parallel in the folded configuration.

Preferably, the front-wheel frame has a front-wheel assembly and the rear-wheel frame has a rear-wheel assembly, the front-wheel assembly having a narrower wheel base than the rear-wheel assembly such that in the folded configuration, the front wheel assembly nests within the rear-wheel assembly.

In a related aspect, the handle frame, the rear-wheel frame and the front-wheel frame are formed from a glass fibre reinforced nylon material. Preferably, the glass fibre reinforced nylon material is a composite with 25% to 35% by weight of glass fibre.

In some embodiments, the rear wheel frame includes a braking mechanism to prevent rotation of the rear wheels, the rear wheel frame further comprising a brake actuator pedal configured for foot actuation of the brake mechanism such that the pedal can be moved between an engaged and dis-engaged position using the sole of the foot only. It will be appreciated that this prevents scuffing to the upper parts of any footwear or injury and discomfort to those with open toed footwear.

BRIEF DESCRIPTION OF THE DRAWINGS

The invention will be described by way of example only with reference to a preferred embodiment illustrated in the accompanying drawings, in which.

DETAILED DESCRIPTION OF PREFERRED EMBODIMENTS

Figure 1:
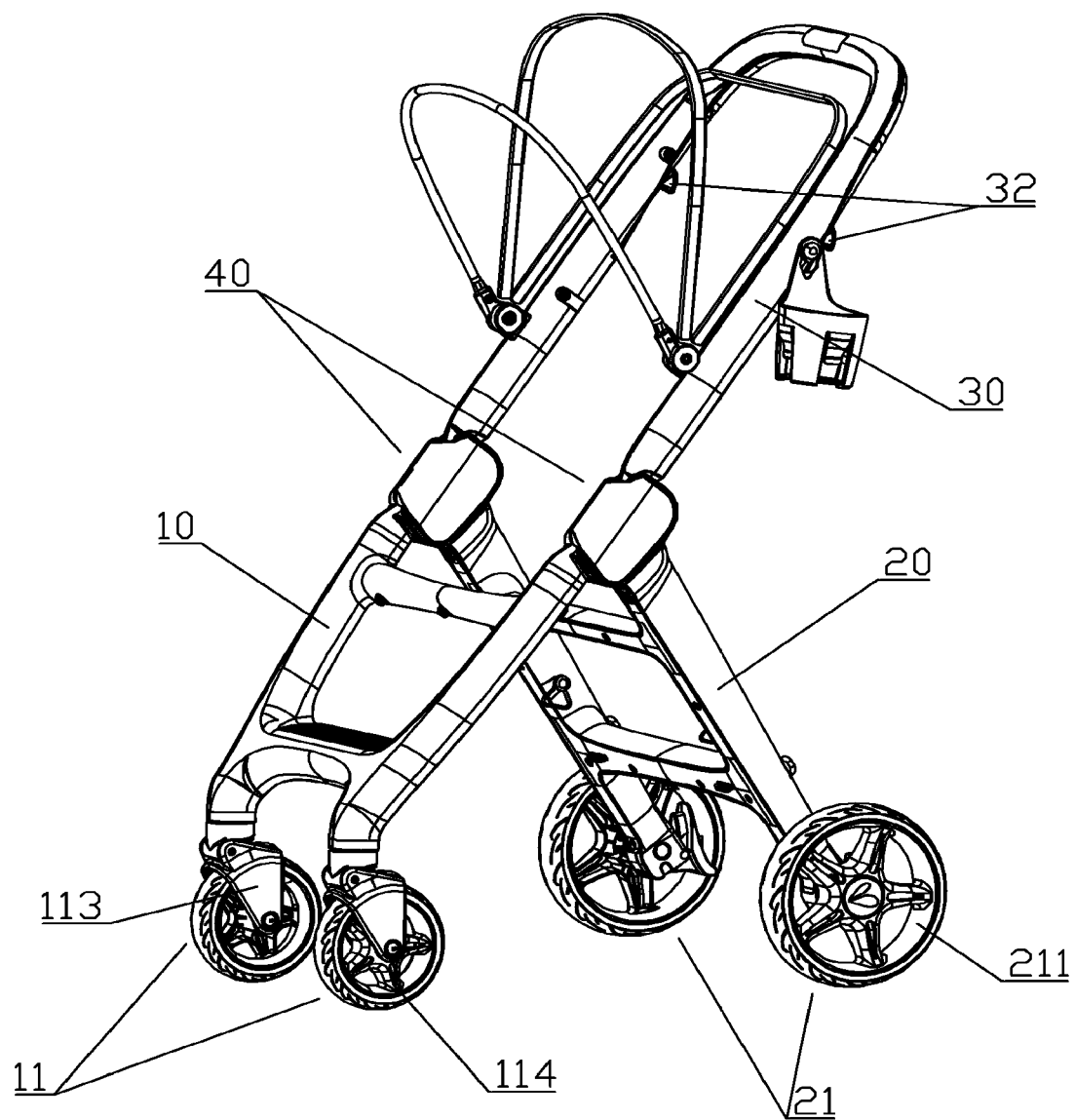
FIG. 1 is a perspective of a collapsible stroller with child seat and hood fabric removed for clarity.
Figure 2:
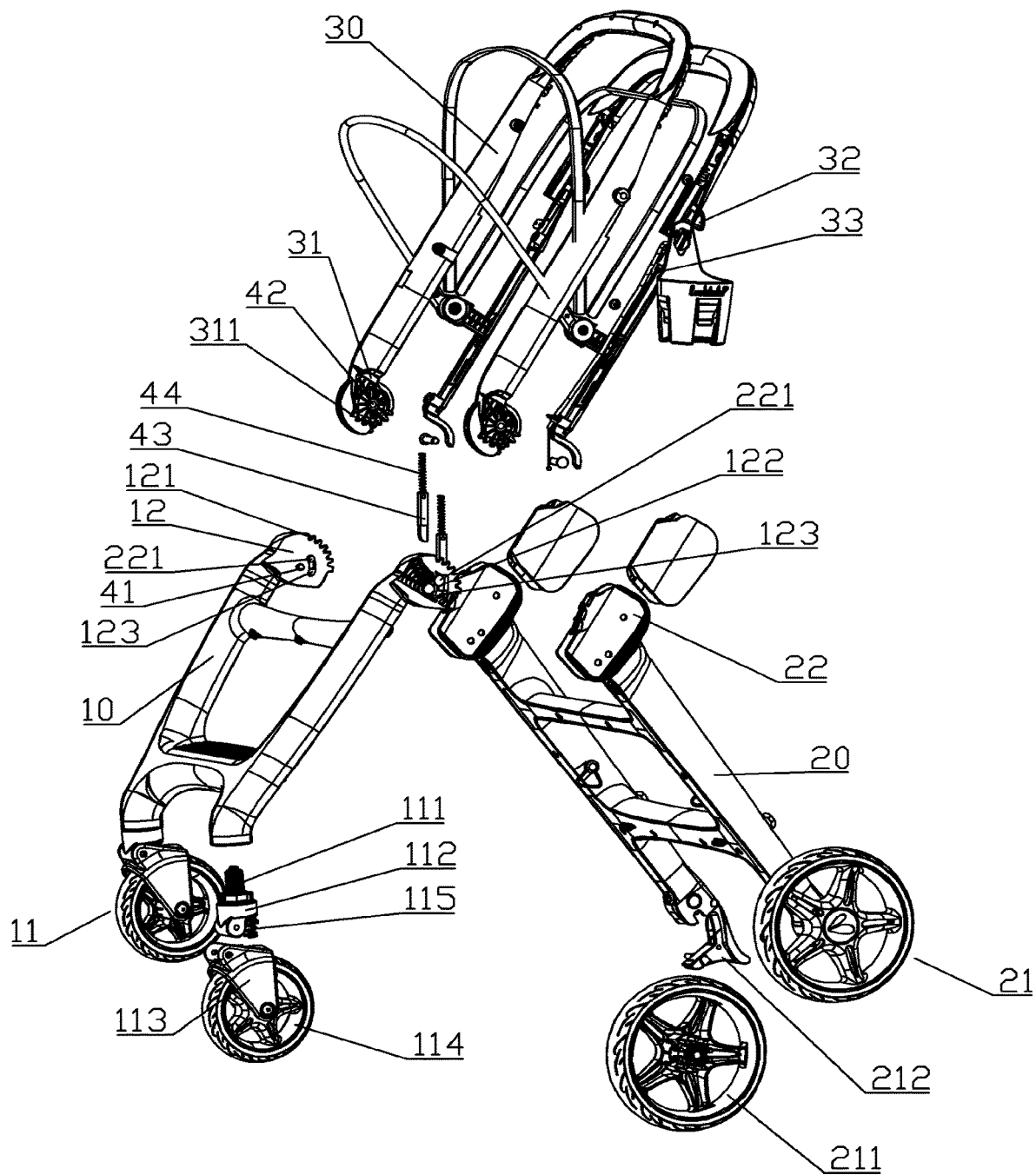
FIG. 2 is an exploded perspective of the collapsible stroller of FIG. 1.
Figure 14:
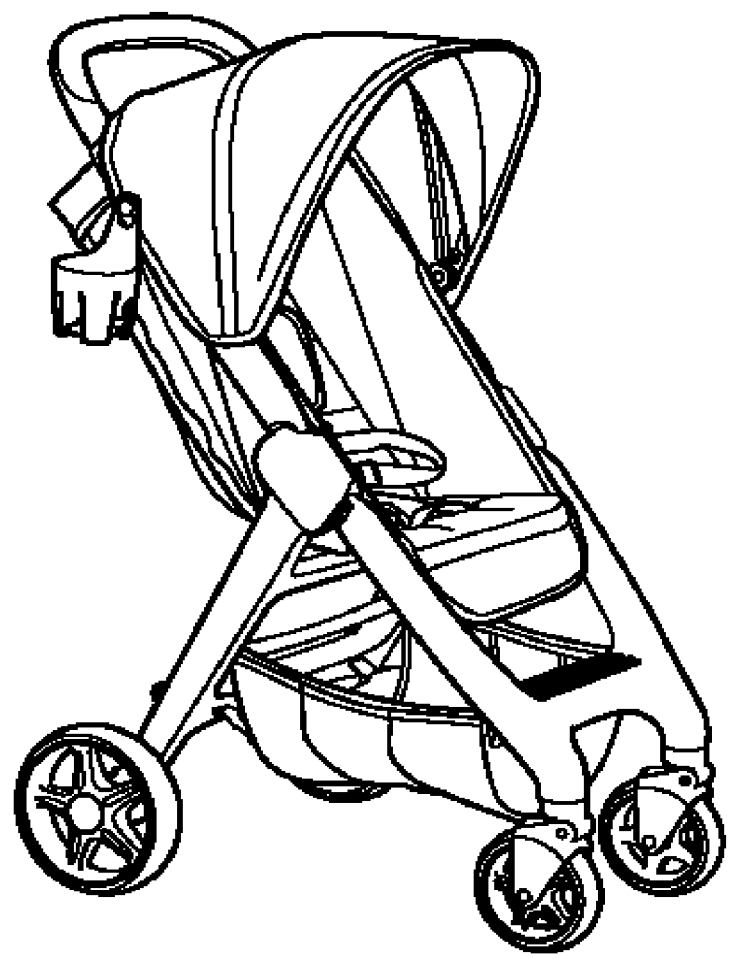
FIG. 14 is a perspective of the stroller in the unfolded configuration together with the child seat, retractable hood and cup holder.
Figure 15:
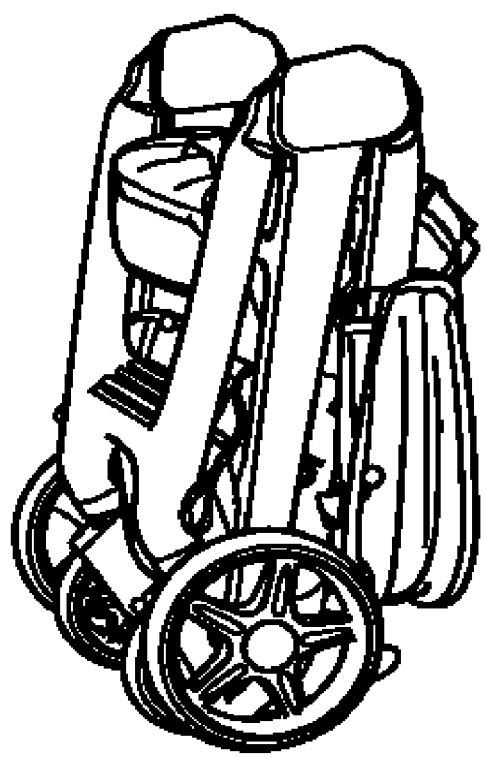
FIG. 15 is a perspective of the stroller shown in FIG. 14 collapsed into the folded configuration.

Referring to FIG. 1, the collapsible stroller is shown (without child seat, harness and hood fabric) in its unfolded configuration, a front wheel frame 10, rear wheel frame 20 and handle frame 30 connect at a pair of hinge joints 40. The complete stroller with child seat 80, fabric-covered retractable hood 82, and cup holder 84 is shown in the unfolded and folded configurations in FIGS. 14 and 15 respectively. A fabric seat 80 with restraint harness 86 suspends from the handle frame 30 and the front wheel frame 10. Retractable hood 32, 82 provides shade when necessary. The front wheel frame 10 has a front wheel assembly 11 with two castors 113 and 114 mounted for rotation about vertical axes for steering and maneuverability. The rear wheel frame 20 has a rear wheel assembly 21 with larger diameter wheels 211 for ride comfort and a brake assembly (described below with reference to FIGS. 6 and 7). FIG. 2 separates the frames and reveals the internal elements of the hinge joints 40. It will be appreciated the left and right hinge joints are mirror images so the description of the left hinge joint (see FIGS. 3, 4 and 5) applies equally to both.

Figure 4:
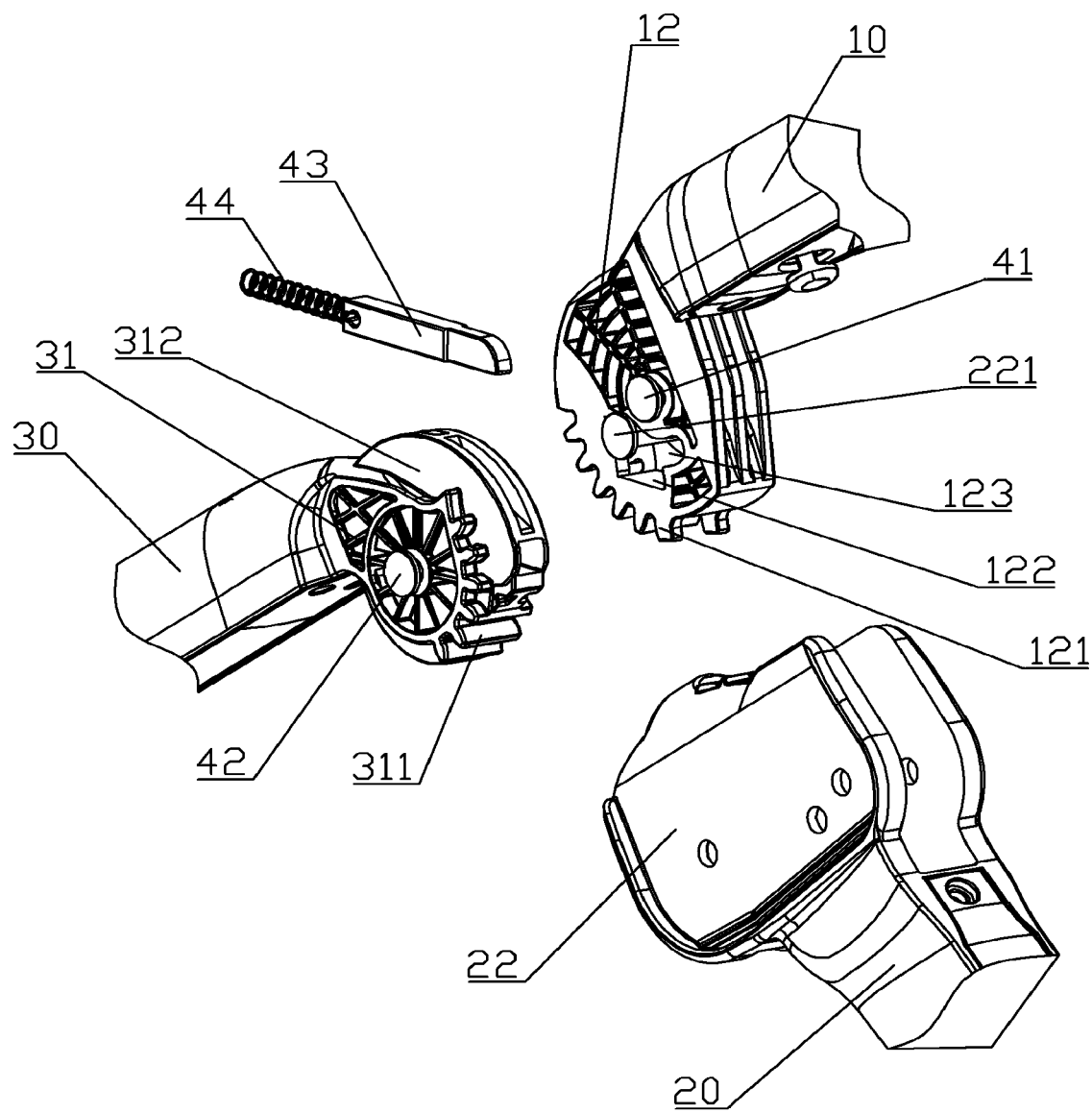
FIG. 4 is an enlarged exploded perspective showing the bottom and left of the left-side hinge joint.

The rear wheel frame 20 has two integrally formed hinge housings 22. Each hinge housing has a pair of spaced metal axles 41 and 42. As best shown in FIG. 4, the front wheel frame 10 is mounted for rotation about one of the axles 42 while the handle frame 30 is rotatably mounted to the metal axle 41. The handle frame 30 and the front wheel frame 10 each have integrally formed spur gear formations 121 and 311 respectively. The teeth of the gear formations 121 and 311 mesh to control the rotation of the handle frame 30 and the front wheel frame 10 relative to the rear wheel frame 20.

Figure 5:
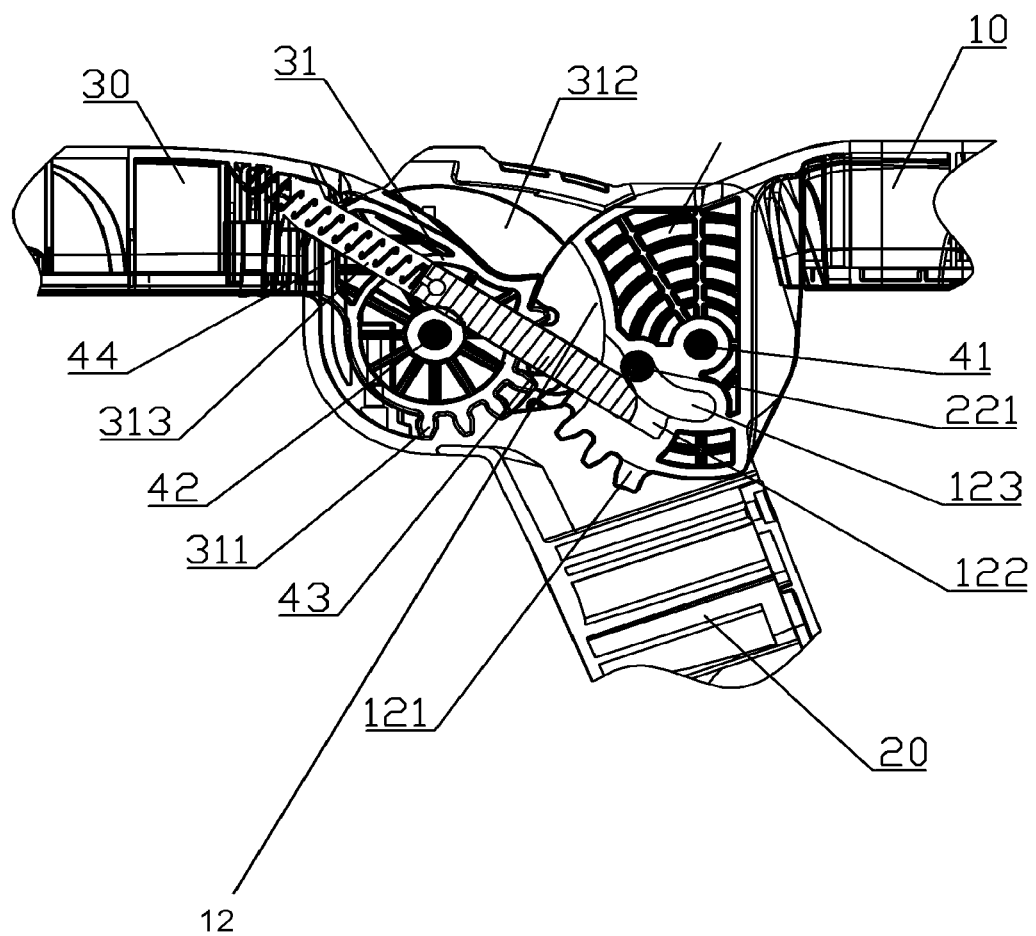
FIG. 5 is a longitudinal sectional view through the hinge joint in the unfolded configuration with locking pin in the locked position.

As best shown in FIG. 5, the handle frame 30 and the front wheel frame 10 combine to make groove 313 and 122 in which a locking pin 43 slides between an unlocking and locking position. The locking pin 43 is in the unlocking position when it is within the groove section 313 defined by the handle frame 30. In the locking position, the locking pin 43 is partially in the groove section 122 defined by the front wheel frame 10 and partially in the groove section 313 in the handle frame 30 as shown in FIG. 5. Spring 44 biases the locking pin 43 into the locking position.

In the locking position, the frames are secured in the unfolded configuration. However, the locking pin 43 not only prevents relative rotation of the handle, front wheel and rear wheel frames, it provides a high strength structural element for transferring loads between each of the frames. To enhance this, metal pin 221 and metal axle 42 provide re-enforced bearing surfaces positioned so that bending and axial loads transfer between them via the locking pin 43.

As a load bearing element within the frame, the locking pin 43 is an 8 mm square stainless steel rod. The pin length extends between the two axles or re-enforced bearing surfaces. It will be appreciated that the locking pin can be different materials and adopt a variety of configurations, but for practical purposes, the locking pin is conveniently metallic and has a minimum cross-sectional dimension of 4 mm and a minimum length of 40 mm.

Figure 3:
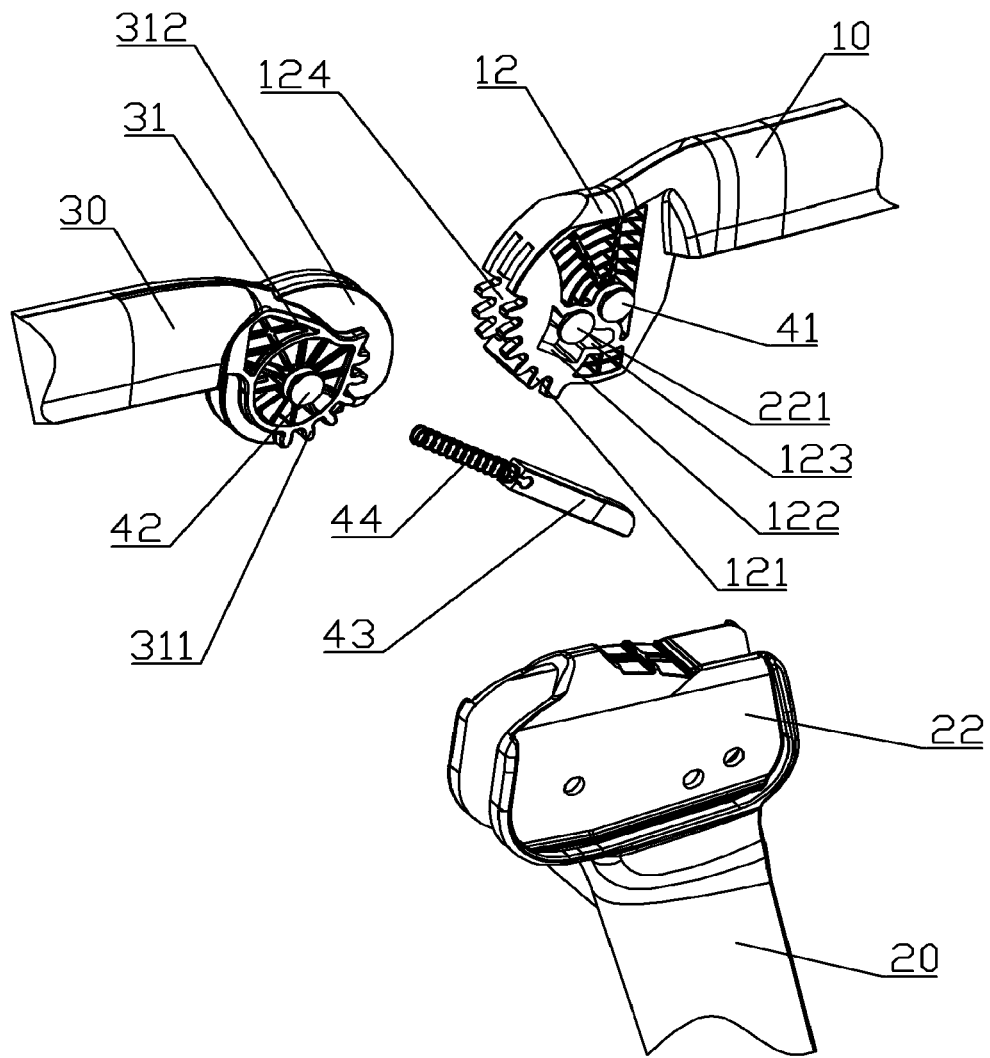
FIG. 3 is an enlarged exploded perspective showing the top and left of the left-side hinge joint.

Referring to FIGS. 3, 4 and 5, the metal pin 221 is closely adjacent the metal axle 41 such that loads from both the front and rear wheel frames (10 and 20) transfer to each other, and the metal axle 42 of the handle frame 30 through the locking pin 43. The added strength and rigidity provided by the locking pin 43 allows the polymer parts of the hinge joint 40 to be smaller and more compact.

Smooth and reliable folding and unfolding of the stroller is important to users. To facilitate this, the hinge joints have a pin guide surface 312 on the hinge housing 22 which co-operates with slide surface 12 on the front wheel frame 10. In the folded configuration, the end of the locking pin 43 is pressed against the pin guide surface 312 by the compressed spring 44. As the stroller is unfolded, the end of the locking pin 43 slides along the pin guide surface 312 toward the spur gear formation 121 of the front wheel frame 10.

As the end of the locking pin 43 meets the spur gear formation 121, the slide surface 12 comes into alignment with the pin guide surface 312 because the relative rotation of each frame is precisely controlled by the meshed teeth of the spur gear formations 311 and 121. By careful configuration of the locking pin 43, the pin guide surface 312 and the slide surface, both curved surfaces have a common tangent at the transition point between the two as the pin guide surface 'hands-off' the end of the locking pin 43 to the slide surface 12 or vice versa.

Once on the slide surface 12, the locking pin 43 continues towards the groove section 122 in the front wheel frame 10. When the groove sections 313 and 112 align, the spring 44 biases the locking pin 43 into the locked position with its rounded end against the metal pin 221. The arcuate opening 123 accommodates the metal pin 221 as the front wheel frame 10 rotates relative to the hinge housing 22.

To collapse the stroller into its configuration, the handle frame 30 is provided with an unlocking actuator 33 with a pair of manually actuated triggers 32 connected by cable to the locking pins 43. The manual triggers 32 are proximate the grip section of the handle frame 30 for retraction by the user which in turn retracts the locking pins 43 into the unlocked position (see FIG. 5). The angle between the longitudinal extent of the handle frame 30 and the direction of movement of the locking pins 43 is kept small and preferably less than 45 degrees. Keeping this angle shallow means the manual force used to retract the triggers 32 is more directly and efficiently applied to the locking pin 43.

With the locking pin in the unlocked position, the stroller can collapse into the folded configuration in which the front wheel frame 10, the rear wheel frame 20, and the handle frame 30 are substantially parallel to each other.

Figure 6:
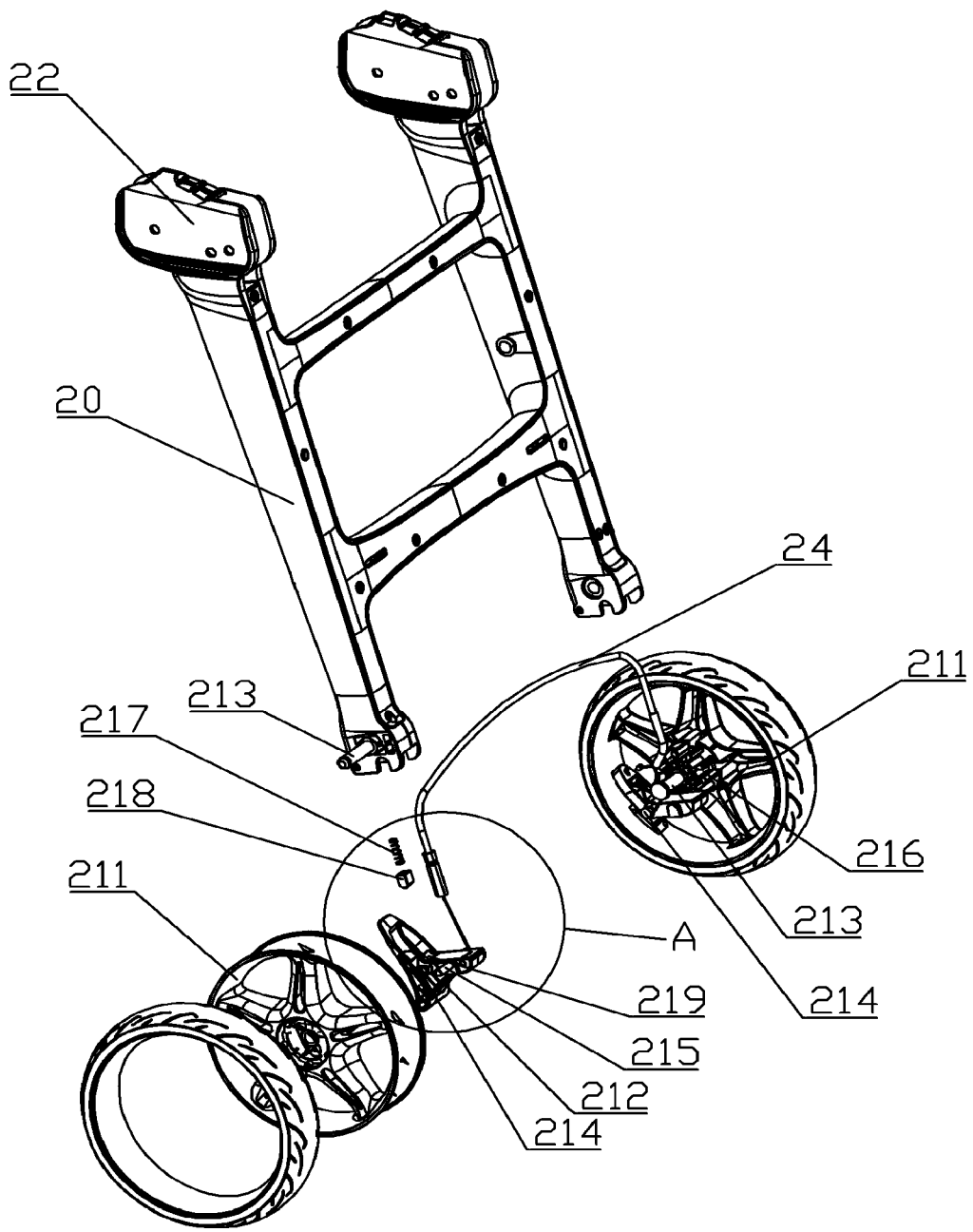
FIG. 6 is an exploded perspective of the underside of the rear wheel frame in isolation.
Figure 7:
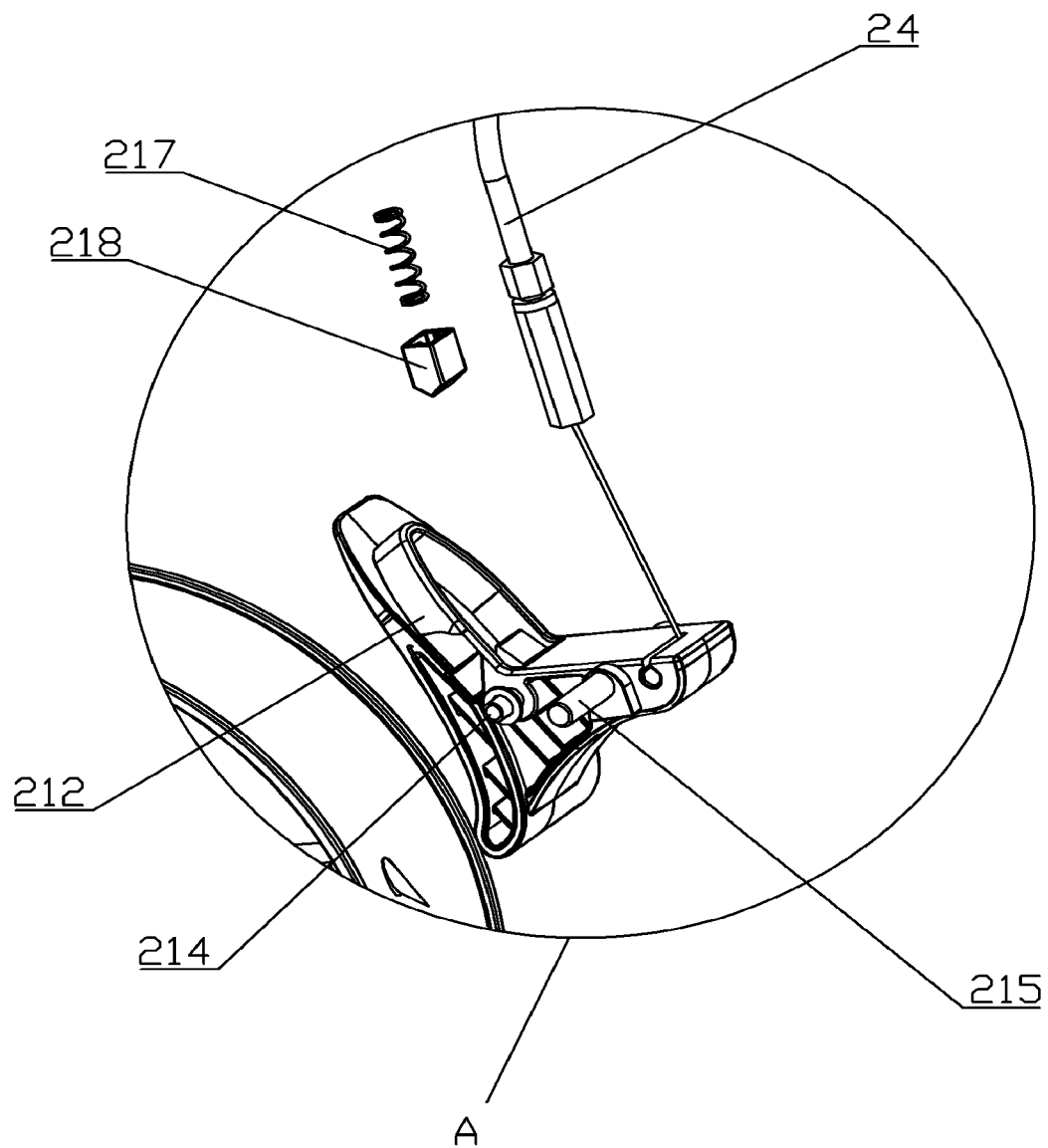
FIG. 7 is an enlarged perspective of inset A shown in FIG. 6.
Figure 8:
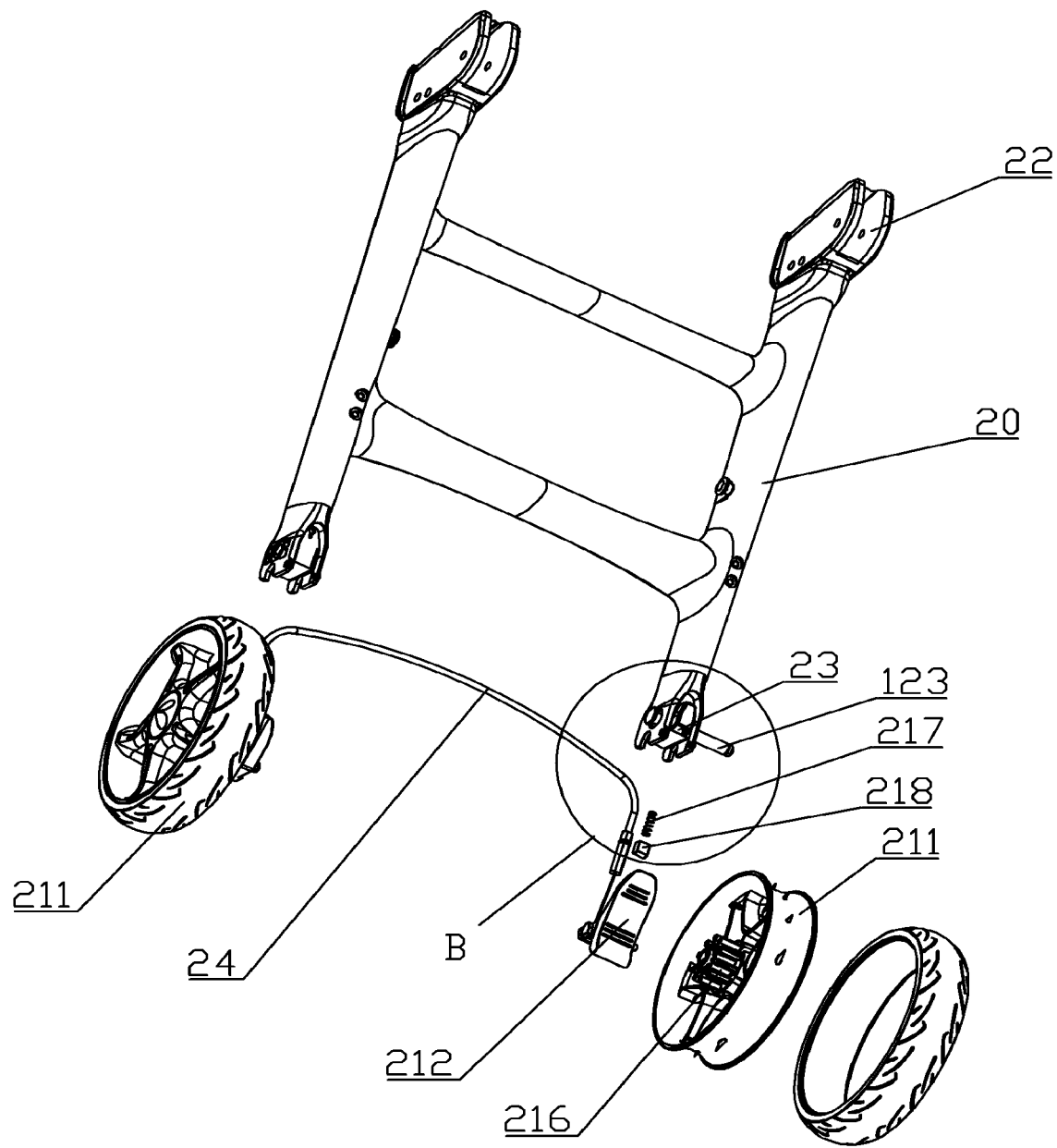
FIG. 8 is an exploded perspective of the top of the rear wheel frame in isolation.
Figure 9:
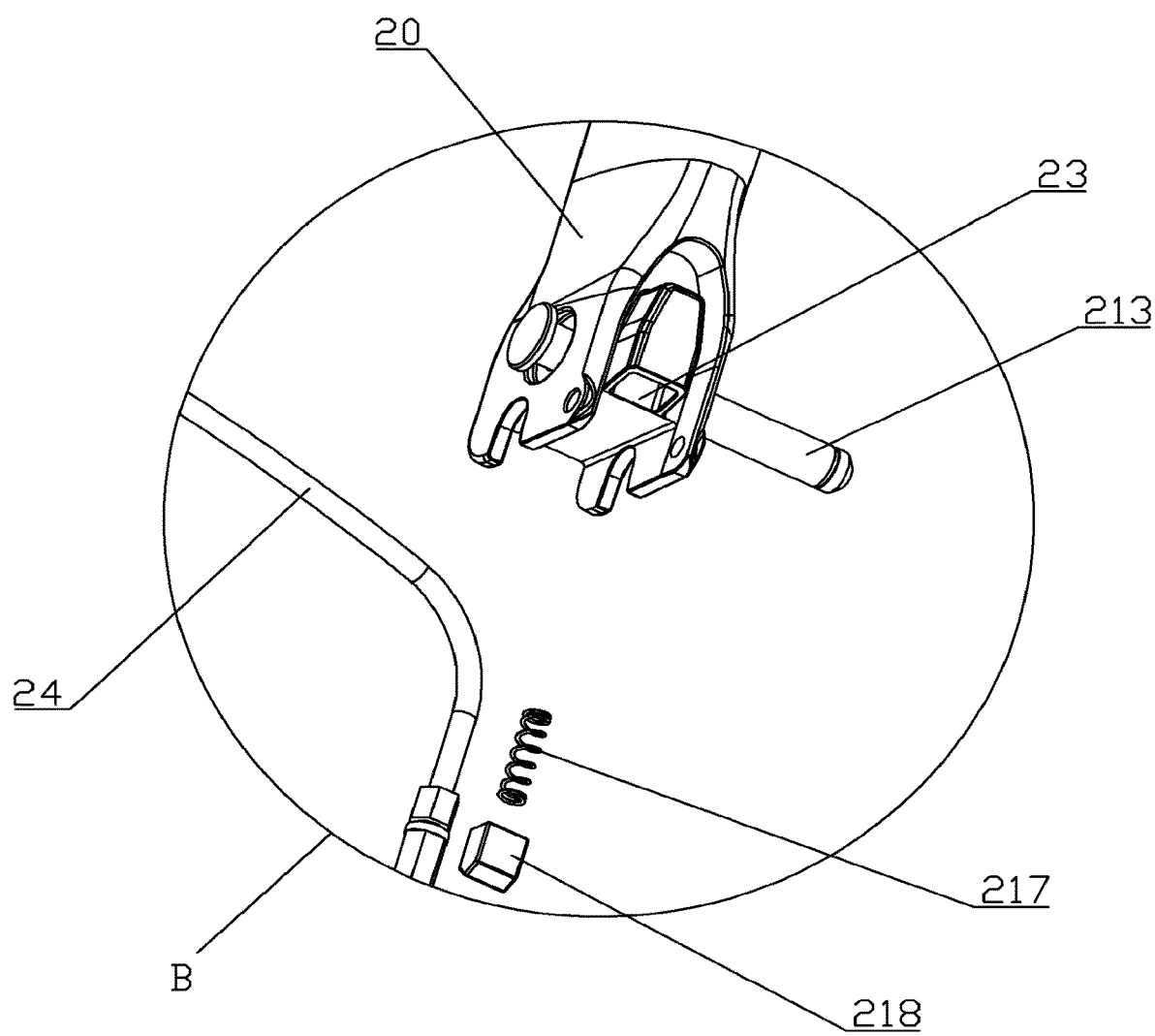
FIG. 9 is an enlarged perspective of inset B shown in FIG. 8.
Figure 10:
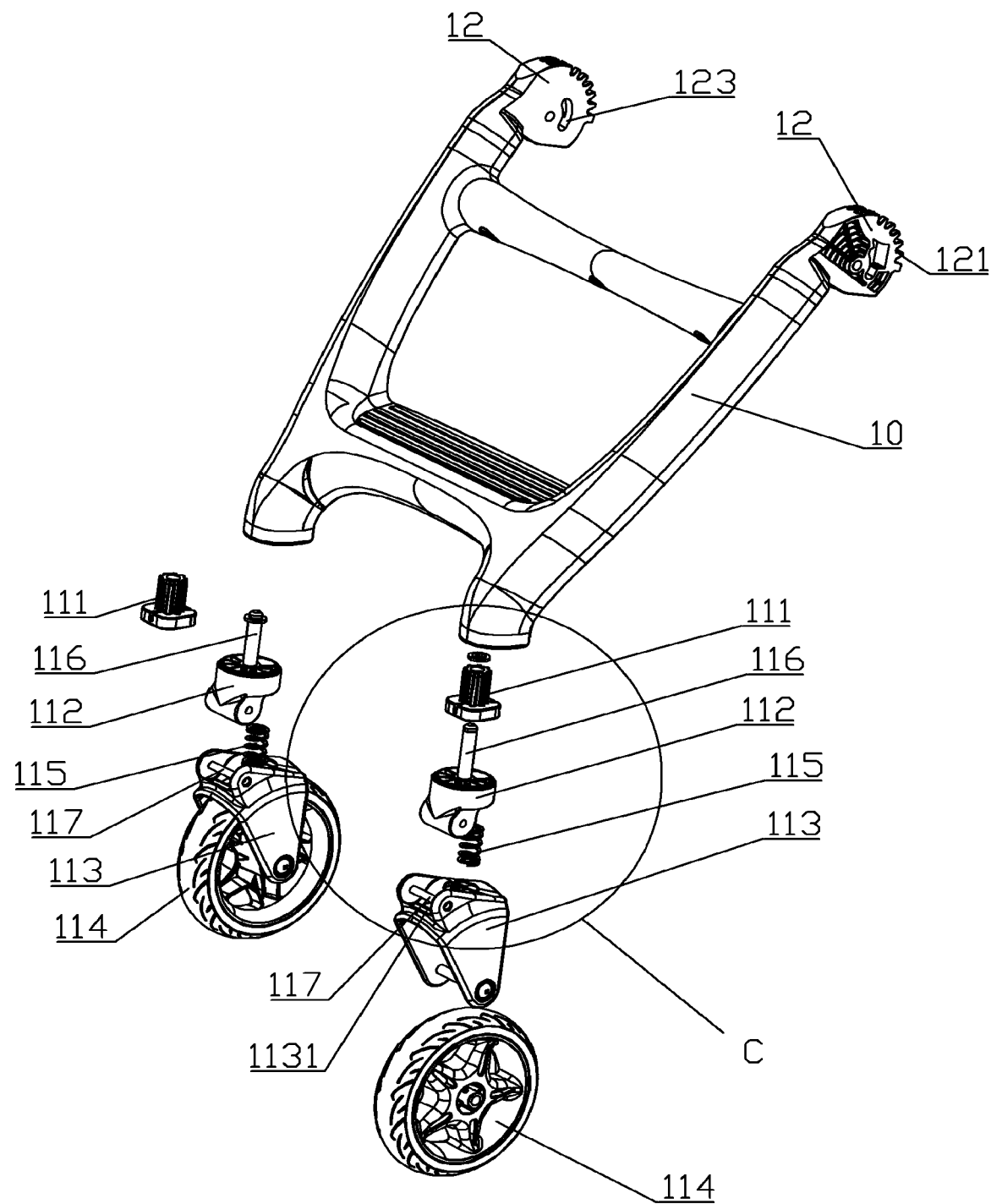
FIG. 10 is an exploded perspective of the top side of the front wheel frame in isolation.
Figure 11:
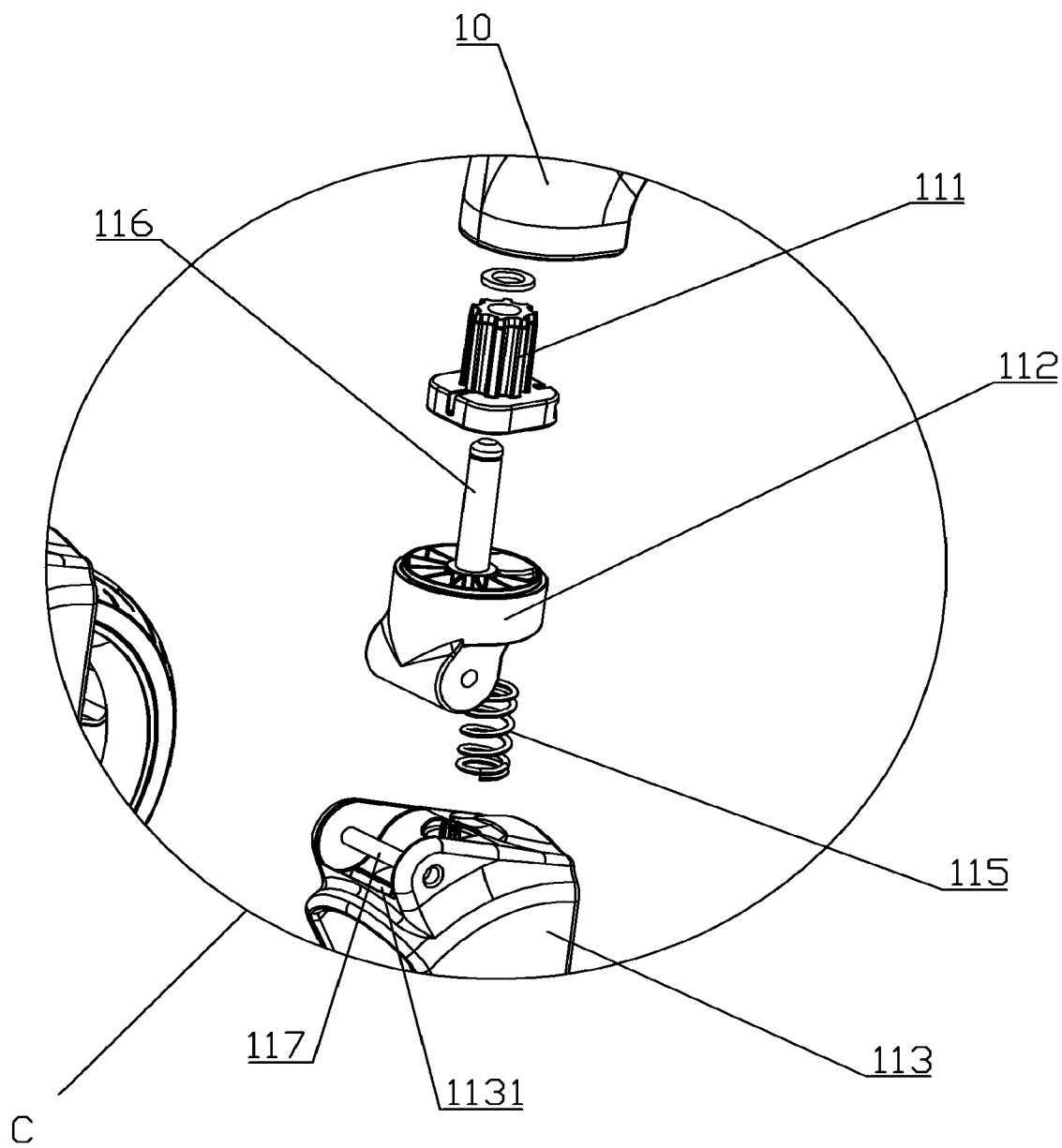
FIG. 11 is an enlarged perspective on inset C shown in FIG. 10.
Figure 12:
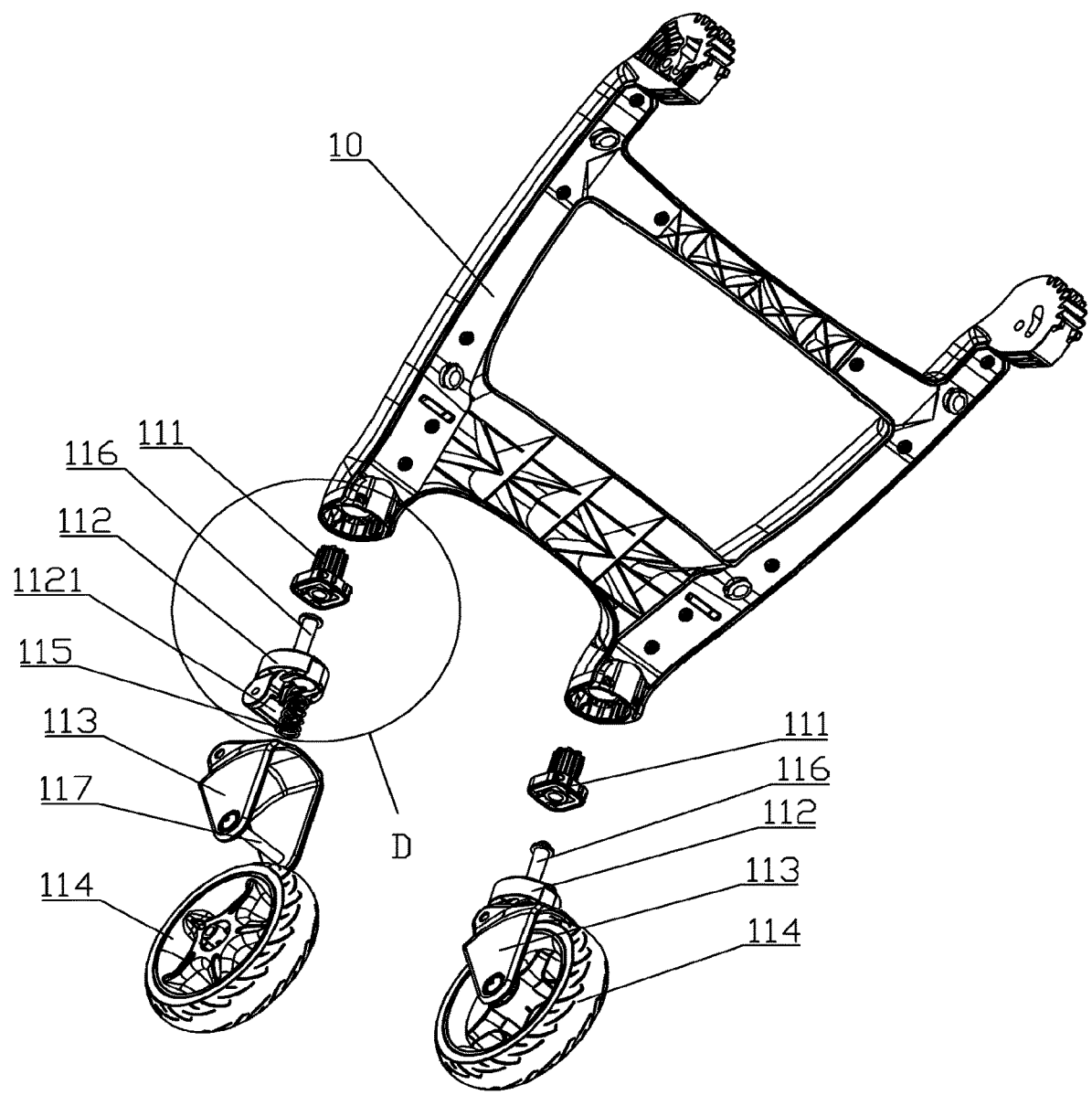
FIG. 12 is an exploded perspective of the underside of the front wheel frame in isolation.
Figure 13:
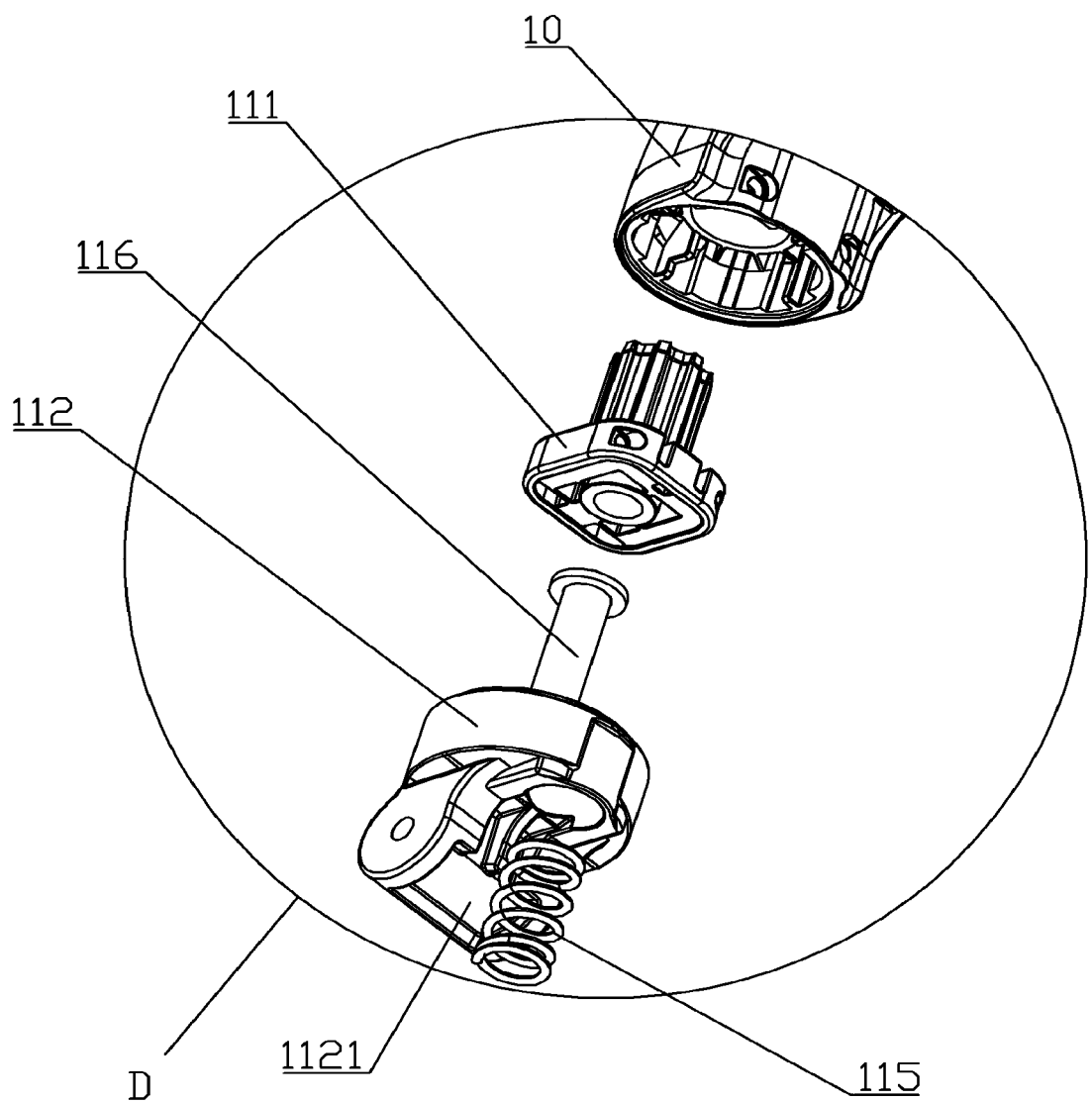
FIG. 13 is an enlarged perspective of inset D shown in FIG. 12.

Referring to FIGS. 6, 7 and 8, the braking mechanism of the rear wheel frame 20 is shown in detail. The brake actuator pedal 212 is mounted to the lower end of the rear wheel frame 20 via pivot axis 214. The spring 217 and wedge-shaped end cup 218 act on the brake pedal 212 to provide an over-centre mechanism whereby the pedal 212 is biased into an engaged position or a dis-engaged position. In the engaged position, the right side locking spigot 215 and the left side locking spigot 213 engage with the rear wheel hub spline formation 216 to prevent the wheels 211 from rotating.

Foot actuation of the brake pedal past the balance point of the over-centre mechanism (217 and 218) biases the left and right locking spigots (213 and 215) out of engagement with the rear hub spline such that wheels 211 rotate freely. Brake cable 24 extend between the brake pedal 212 and corresponding pivot mount for the left locking spigot to synchronise braking of both wheels 211.

The brake pedal 212 is positioned such that it is foot actuated using the sole of the foot or shoe only. This avoids any scuffing to the upper surfaces of any footwear or potential injury for those with open toed footwear.

Referring to FIGS. 10, 11, 12 and 13, the front wheel assembly 11 of the front wheel frame 10 is shown in detail. The front wheels 114 are castors mounted for rotation about vertical axles 116 for steering and maneuverability of the stroller. A vertical axle mount is inserted into the lower end of the front wheel frame 10 and held by interference fit. The vertical axles of the rotatable hinge mount 112 are retained in the bore of the vertical axle mount via a cir-clip. The sprung wheel mounts 113 pivotally attach to the rotatable hinge mounts via hinge axles 117. Suspension spring 115 acts between the rotatable hinge mount 112 and the sprung wheel mount 113 to provide the front wheels 114 with suspension. It will be appreciated that sprung suspension on the front wheels improve the ride quality for the child or toddler and dampen impact loads on the collapsible frame caused by ground irregularities.

Comprises/comprising and grammatical variations thereof when used in this specification are to be taken to specify the presence of stated features, integers, steps or components or groups thereof, but do not preclude the presence or addition of one or more other features, integers, steps, components or groups thereof.

The present invention has been defined herein by way of example only. The skilled workers in this field will readily recognise many variations and modifications which do not depart from the spirit and scope of the broad inventive concept.

The invention claimed is:

1. A collapsible stroller, comprising:
a front wheel frame,
a rear wheel frame;
a handle frame;
a hinge joint that connects the front wheel frame and the rear wheel frame with the handle frame, wherein a locking element enables the stroller to be converted between folded and unfolded configuration, where in a spur-gear integrally formed with the handle frame meshes with a spur-gear integrally formed with the front wheel frame, further wherein the locking element slides within a two-section groove and where the hinge joint has at least two reinforced bearing surfaces adjacent to the locking element to allow structural loads to be transferable between the reinforced bearing surfaces and the locking element.

2. The collapsible stroller according to claim 1, wherein the locking element is a metallic locking pin.

3. The collapsible stroller according to claim 2, wherein the hinge joint has at least two reinforced bearing surfaces adjacent the locking element when in the locked position such that structural loads are transferrable between the reinforced bearing surfaces via the locking element.

4. The collapsible stroller according to claim 3, wherein at least one of the at least two reinforced bearing surfaces is provided by a metal axle.

5. The collapsible stroller according to claim 4, wherein another one of the at least two reinforced bearing surfaces is provided by a movable pin element located closely adjacent the metal axle of the front wheel frame and which is configured to move into a load bearing position when the locking pin moves to the locked position and moves away from the load bearing position when the locking pin retracts from the locked position.

6. A collapsible stroller according to claim 5, wherein the movable pin element extends parallel to the metal axle of the front wheel frame and is guided in an arcuate slot about the front wheel frame axle.

7. A collapsible stroller comprising:
- a predominantly polymer handle frame;
- a predominantly polymer front wheel frame;
- a predominantly polymer rear wheel frame;
- a hinge joint connecting the handle frame, the front wheel frame and
- a locking element at the hinge joint slidingly moveable between an unlocked position in which the handle frame, front wheel frame and rear wheel frame are enabled to mutually rotate into a folded configuration, and a locked position in which the handle, front wheel and rear wheel frames are fixed to each other in an unfolded configuration;

wherein the hinge joint comprises a hinge housing of polymer material integrally formed with the polymer rear wheel frame, a spur-gear formation of polymer material integrally formed with the handle frame, the handle frame spur-gear formation configured for rotation about one of the hinge axles within the hinge joint, and a spur-gear formation of polymer material integrally formed with the polymer front wheel frame, the front wheel frame spur-gear formation configured for rotation about the other one of the hinge axles within the hinge joint and meshing with the handle frame spur-gear formation.

8. The collapsible stroller according to claim 7, wherein the locking element is a metallic locking pin.

9. The collapsible stroller according to claim 8, wherein the hinge joint has at least two reinforced bearing surfaces adjacent the locking element when in the locked position, such that structural loads are transferrable between the reinforced bearing surfaces via the locking element.

10. The collapsible stroller according to claim 9, wherein at least one of the at least two reinforced bearing surfaces is a metal axle.

11. The collapsible stroller according to claim 10, wherein another one of the at least two reinforced bearing surfaces is provided by a movable pin element located closely adjacent the metal axle of the front wheel frame and which is configured to move into a load bearing position when the locking pin moves to the locked position and moves away from the load bearing position when the locking pin retracts from the locked position.

12. A collapsible stroller according to claim 11, wherein the movable pin element extends parallel to the metal axle of the front wheel frame and is guided in an arcuate slot about the front wheel frame axle.

* * * * *